US009669780B2

(12) United States Patent
Ambrosio et al.

(10) Patent No.: US 9,669,780 B2
(45) Date of Patent: Jun. 6, 2017

(54) ELECTRICAL SYSTEM ASSEMBLY FOR A MOTOR VEHICLE

(71) Applicant: Mahle International GmbH, Stuttgart (DE)

(72) Inventors: Daniele Ambrosio, Stuttgart (DE); Tobias Binder, Stuttgart (DE); Markus Cramme, Wildberg (DE); Michael Krappel, Stuttgart (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 14/893,462

(22) PCT Filed: Apr. 29, 2014

(86) PCT No.: PCT/EP2014/058654
§ 371 (c)(1),
(2) Date: Nov. 23, 2015

(87) PCT Pub. No.: WO2014/187650
PCT Pub. Date: Nov. 27, 2014

(65) Prior Publication Data
US 2016/0101748 A1    Apr. 14, 2016

(30) Foreign Application Priority Data
May 24, 2013   (DE) .................. 10 2013 209 712

(51) Int. Cl.
*B60L 1/00* (2006.01)
*B60L 3/00* (2006.01)
(Continued)

(52) U.S. Cl.
CPC ............... *B60R 16/03* (2013.01); *H02M 3/07* (2013.01)

(58) Field of Classification Search
USPC ....................................................... 307/10.1
See application file for complete search history.

(56) References Cited

U.S. PATENT DOCUMENTS 5,621,250 A    4/1997   Kim
6,304,043 B1 * 10/2001  Klostermeier ......... G08C 17/06
                                                     307/141

(Continued)

FOREIGN PATENT DOCUMENTS

DE        4423066 C1   12/1995
DE       19930358 A1    1/2001
(Continued)

OTHER PUBLICATIONS

English abstract for EP1291998.
(Continued)

*Primary Examiner* — Rexford Barnie
*Assistant Examiner* — Xuan Ly
(74) *Attorney, Agent, or Firm* — Fishman Stewart PLLC

(57) ABSTRACT

An electrical system assembly for a motor vehicle may include a first electrical system and a second electrical system galvanically isolated from the first electrical system. The second electrical system may be switchable between an idle state and an active state. A capacitive coupling element may couple the first electrical system to the second electrical system. A signal transmission unit may be arranged in the first electrical system and may be configured to transmit an activation signal to the capacitive coupling element for activating the second electrical system. A signal receiving unit may be arranged in the second electrical system and be configured to receive the activation signal via the capacitive coupling element and switch the second electrical system from the idle state to the active state.

16 Claims, 1 Drawing Sheet

(51) Int. Cl.
    *H02G 3/00*    (2006.01)
    *B60R 16/03*    (2006.01)
    *H02M 3/07*    (2006.01)

(56) References Cited

U.S. PATENT DOCUMENTS

| | | | |
|---|---|---|---|
| 2002/0196001 A1 | 12/2002 | Morgen | |
| 2003/0011248 A1* | 1/2003 | Horbelt | H02H 3/202 307/130 |
| 2004/0056534 A1* | 3/2004 | Linke | H02J 1/08 307/75 |
| 2008/0136374 A1 | 6/2008 | Nelson et al. | |
| 2010/0033013 A1 | 2/2010 | Polenov et al. | |
| 2012/0056474 A1* | 3/2012 | Larson | B60R 16/03 307/9.1 |
| 2012/0230071 A1* | 9/2012 | Kaneda | H02M 3/073 363/59 |
| 2013/0082523 A1 | 4/2013 | Buchzik et al. | |

FOREIGN PATENT DOCUMENTS

| | | |
|---|---|---|
| DE | 10129789 C1 | 11/2002 |
| DE | 102008037242 A1 | 2/2010 |
| DE | 102010025198 A1 | 12/2011 |
| EP | 1291998 A2 | 3/2003 |
| EP | 1568601 A1 | 8/2005 |
| WO | WO-02/47234 A1 | 6/2002 |
| WO | WO-2012/104193 A1 | 8/2012 |

OTHER PUBLICATIONS

English abstract for EP1568601.
English abstract for DE4423066.
German Search Repot for DE-102013209712.3, mailed Feb. 5, 2014.

* cited by examiner

ELECTRICAL SYSTEM ASSEMBLY FOR A MOTOR VEHICLE

CROSS-REFERENCE TO RELATED APPLICATIONS

This application claims priority to German Patent Application No. 10 2013 209 712.3, filed May 24, 2013, and International Patent Application No. PCT/EP2014/058654, filed Apr. 29, 2014, both of which are hereby incorporated by reference in their entirety.

TECHNICAL FIELD

The present invention relates to an electrical system assembly for a motor vehicle and to an electrical consumer with such an electrical system assembly. The invention, furthermore, relates to an electrical system with at least two such electrical consumers and to a motor vehicle with at least one such electrical system assembly and/or with at least one such electrical system. Finally, the invention relates to a method for activating an electrical system from an idle state.

BACKGROUND

In modern motor vehicles, at least two different electrical systems, for example a 12 V electrical system and a 48 V electrical system are usually employed, which supply different electrical/electronic components with the electrical supply voltage needed by these. In order to save the energy supply units of the motor vehicle—usually rechargeable batteries—when the motor vehicle is in a switched-off state and consequently cannot be recharged in driving mode with the help of a generator installed in the motor vehicle, the electrical systems that are present in the motor vehicle can be frequently switched between an active state and a so-called idle state. In the idle state, the electrical consumers that are connected to the electrical system can be electrically isolated from the energy supply unit by means of an electrical/electronic switch or by using suitable integrated switching circuits (ICs) in the manner of voltage transformers, communication ICs etc. The idle state is thus characterized by a greatly reduced energy consumption of the electrical consumers that are connected to the electrical system in the motor vehicle, so that the energy supply unit is saved. In particular, undesirable complete discharge of the energy supply unit is prevented in this way, when the vehicle is in the switched-off state.

In the active state, the energy supply unit, by contrast, is connected to the electrical system assigned to it, i.e. an electrical isolation by means of the interruption circuits mentioned above does not take place so that the energy supply unit can provide the electrical consumers with the electric energy required for nominal operation. In order to now switch the electrical systems from said idle state to the active state, which corresponds to a so-called "wake-up" of the electrical system from the idle state, an electrical/electronic switch, which isolates the energy supply unit from the remaining residual electrical system, is switched to a closed state so that the energy supply unit is electrically connected to the electrical system.

In case that the motor vehicle comprises multiple electrical systems, such a wake-up signal has to be individually transmitted to all electrical systems and each electrical system separately switched from the idle state to the active state. A corresponding activation signal can be provided in all electrical systems of the motor vehicle for example by a CAN or LIN bus system that is available in the motor vehicle, but which however is technically relatively complex to realise since the bus system, in all electrical systems, has to be coupled to the corresponding switches or voltage dividers/ICs. The same applies when instead of the bus system a starter device for activating the internal combustion engine of the motor vehicle, for example the so-called "terminal 15" is activated when switching on the starter device.

SUMMARY

The present invention deals with the general problem to show new ways in the development of electrical system assemblies for a motor vehicle which can be switched between an active state and an idle state.

This problem is solved through the subject of the independent patent claims. Preferred embodiments are subject of the dependent claims.

The invention is based on the general idea of coupling a first electrical system that is galvanically isolated from a second electrical system by means of a capacitive coupling element, so that the first electrical system by means of this coupling element is capacitively coupled to the second electrical system for transmitting a wake-up signal. To generate such a wake-up or activation signal, which for example can be an electrical square-wave signal or another comparable alternating voltage signal, a signal generation unit is provided in the first electrical system which interacts with the coupling element. By means of such a signal generation unit, an activation signal for activating the second electrical system from the idle state can be provided at the coupling element on the input side. Accordingly, a signal receiving unit is provided in the second electrical system which is to be "woken up" from the idle state from the first electrical system, which signal receiving unit interacts with the coupling element in such a manner that as a consequence of a provision of the activation signal at the coupling element on the output side the second electrical system is switched from the idle state to the active state.

With the electrical system assembly according to the invention, indirect activation of the second electrical system, which is galvanically isolated from the first electrical system, is thus possible by means of a capacitive coupling element. In addition to such a coupling element, merely a signal generation unit and a signal receiving unit are thus required in the first and second electrical system respectively according to the invention. In case that in the first electrical system, for example through the bus system of the motor vehicle, a wake-up signal is generated and as a consequence of this wake-up signal the first electrical system is switched from an idle state to an active state, this can be transmitted by means of simple capacitive coupling to the second electrical system—and obviously also to further electrical systems that are present in the motor vehicle. Technically complex coupling of the bus system to all electrical systems of the motor vehicle in such a manner that the wake-up signal is separately provided and further processed by the bus system in all electrical systems is thus omitted. The same applies when the wake-up signal is provided by means of the starter device of the motor vehicle. In this case, too, it is adequate with the electrical system assembly according to the invention when only the first electrical system is coupled to the starter device and transmission to the second electrical system or to further electrical systems that are present in the motor vehicle takes place by means of the capacitive coupling element according to the invention. By means of the capacitive coupling element the signal transmission from the first to the second electrical system can be realised in a technically simple manner. The use of technically complex optocouplers to be installed which additionally have the disadvantage that they are not suitable for the relatively high operating temperatures that frequently occur in motor vehicles, is not required.

With the electrical system assembly according to the invention, a semiconductor switch can now be provided in the second electrical system by means of which an electrical connection of the energy supply unit assigned to the second electrical system can be optionally cancelled or re-established. This corresponds to the switching of the second electrical system from the idle state to the active state and vice versa, i.e. when generating the wake-up signal in the first electrical system and a subsequent transmission of the activation signal from the first to the second electrical system, closing of the semiconductor switch is brought about when the activation signal is received by the signal receiving device so that in this manner the electrical isolation of the energy supply unit from the second electrical system that is present in the idle state is cancelled. Accordingly, the energy supply unit can supply all electrical consumers that are connected to the second electrical system with electric energy.

The signal generation unit in the first electrical system can be activated by means of a suitable control unit, for example in the manner of a microcontroller or similar, wherein the control unit can interact with the bus system of the motor vehicle or with the starter device of the internal combustion engine of the motor vehicle.

In case that in the first electrical system a wake-up signal is provided by the bus system or the starter device, the signal generation unit can be activated by means of the control device in such a manner that the same generates the activation signal and provides it at the coupling element. In the simplest case, such a control unit can be a conventional electric signal line which suitably interacts with the signal generation unit so that when an electrical system is provided on this control line the signal generation unit is activated in such a manner that it provides the activation signal for transmission to the second electrical system.

In a preferred embodiment, the capacitive coupling element can comprise two capacitors that are electrically switched parallel to one another, in particular ceramic chip capacitors (MLCC). Such capacitors are electronic standard components and thus commercially available in large quantities and cost-effectively, which in turn has a favourable effect on the manufacturing costs of the entire electrical system assembly.

Particularly preferably, the electrical system assembly can be designed in such a manner that an electric current that is provided by an energy supply unit in the second electrical system in the idle state does not exceed a predetermined maximum value. To this end, an electrical switch, in particular in the manner of a semiconductor switch, preferentially a transistor, can be provided for example in the second electrical system which in the idle state isolates the energy supply unit from the second electrical system. Such isolation can be realised in that the electric current that can be provided by the energy supply unit assumes a zero value, but the isolation by means of the semiconductor switch can also take place in such a manner that the second electrical system is provided with an electric closed-circuit current by the energy supply unit in the idle state, which does not exceed a predetermined maximum value.

For realising the current limitation in the idle state of the second electrical system described above, an integrated circuit in the manner of a voltage transformer or of a suitable communications IC can also be alternatively provided instead of a semiconductor switch, which lowers the nominal electrical supply voltage supplied by the energy supply unit to a lower value for as long as the idle state is set.

In principle, with an advantageous further development, a switchable electrical/electronic switching element can be provided in the second electrical system which can be switched between an opened state, which is assigned to the idle state of the second electrical system and a closed state, which is assigned to the active state of the second electrical system. According to this embodiment, the energy supply unit in the closed state of the switching element is electrically connected to the second electrical system and in the opened state electrically isolated from the same. "Isolation" in this case can mean, as described above, that the electric current maximally provided by the energy supply unit does not exceed a predetermined maximum value. The "opened" state does not necessarily mean a complete lowering of the electric current that can be provided by the energy supply unit of the second electrical system to a zero value.

For activating the electrical/electronic switching element, a control unit which interacts with the signal receiving unit can now be provided in the second electrical system according to this embodiment, which switches the switching element to the closed state when the activation signal is received by the signal receiving unit. Such signal receiving unit can be realised in the manner of a microcontroller or of an integrated circuit (ICs). In the simplest case it can also be considered to provide an electric rectifier which smoothes the alternating voltage signal provided on the coupling element output side. By means of such smoothing, controlling of the switching element, for example of a transistor, can then take place for example.

In a particularly preferred embodiment, a charge pump can be provided in the first electrical system between the signal generation unit and the coupling element, which acts as a direct voltage transformer and by means of which an amplitude of the alternating voltage signal generated by the signal generation unit can thus be adjusted.

According to an advantageous further development, the signal generation unit can comprise a signal generator by means of which for generating the activation signal an electrical alternating voltage signal, in particular a square-wave voltage can be generated. The signal generation unit can also be realised in the form of an integrated circuit (IC) or be part of a microcontroller. Such integrated circuits or microcontrollers are commercially available in large quantities and cost-effectively, which has a favourable effect on the manufacturing costs of the entire electrical system assemblies.

The invention, furthermore, relates to an electrical consumer, in particular an oil pump or an electric coolant pump or an electric exhaust gas turbocharger or an electric compressor or an electric fan with an electrical system assembly with one or more of the features explained above.

The invention also relates to an electrical system, in particular for a motor vehicle, with at least two electrical consumers introduced above, which are electrically connected to one another by means of the first and second electrical system. The electrical system has a common second electrical energy supply unit that is arranged in the second electrical system, which in the idle state of the second electrical system is electrically isolated from the same and in the active state is electrically connected to the same.

Finally, the invention relates to a motor vehicle with at least one electrical system assembly with one or more of the features explained above and/or at least one electrical system introduced above.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters relate to same or similar or functionally same components.

BRIEF DESCRIPTION OF THE DRAWINGS

It shows, in each case schematically

DETAILED DESCRIPTION

Figure 1:
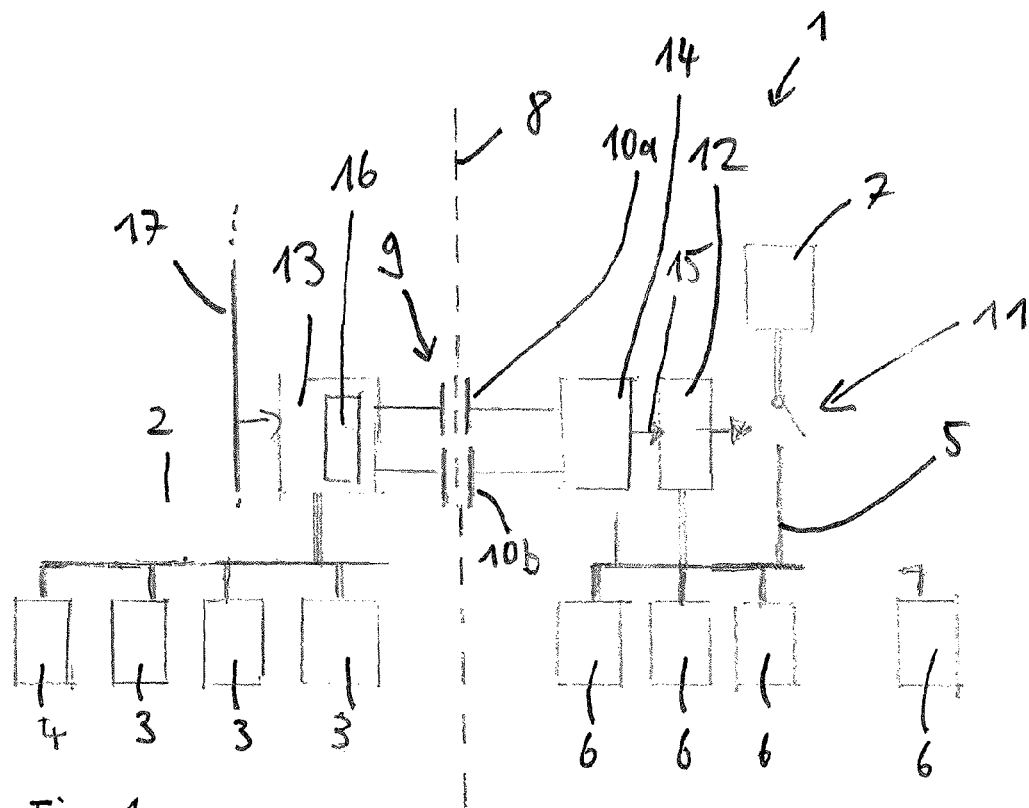
FIG. 1 an example for an electrical system assembly according to the invention in a rough schematic circuit diagram-like representation, FIG. 2 an example for an electrical system with an electrical system assembly according to the invention, likewise in a circuit diagram-like representation.

In FIG. 1, an electrical system assembly according to the invention is roughly schematically shown in a circuit diagram-like representation and marked with 1. The electrical system assembly 1 comprises a first electrical system 2, by means of which different electrical/electronic components 3 are supplied with electric energy by a first electric energy supply unit 4. The first electrical system 2 can for example be a 12 V electrical system, i.e. the first energy supply unit 4 in the form of a rechargeable battery provides an output voltage of 12 V as electric output voltage in the first electrical system 2.

In FIG. 1, three electrical/electronic components 3 are exemplarily shown which are connected to the first electrical system 2; it is clear however that another number of such components 3 can also be arranged in the first electrical system 2. The electrical system assembly 1 furthermore comprises a second electrical system 5 that is galvanically isolated from the first electrical system 2. By means of the second electrical system 5 electrical/electronic components 6 which are connected to the second electrical system 5 can be supplied with electric energy from a second energy supply unit 7 analogously to the first electrical system 2. The second electrical system 5 in this case can for example be a 48 V electrical system, i.e. the electrical output voltage that is provided to the second electrical system 5 by the second energy supply unit 7 is 48 V; obviously, other electric voltage values are also possible in versions.

The galvanic isolation of the first electrical system 2 from the second electrical system 5 is rough-schematically shown in FIG. 1 by a dashed line with the reference number 8. In the electrical system assembly 1, a capacitive coupling element 9 is now provided, by means of which the first electrical system 2 is capacitively coupled to the second electrical system 5 for signal transmission. In this way, the second electrical system, which can be switched between an idle state and an active state, can be informed via a wake-up signal that is provided in the first electrical system 2, for example by a bus system of the motor vehicle and consequently be switched from the idle state to the active state. The capacitive coupling element 9 in this case as shown in FIG. 1 can for example comprise two capacitors 10a, 10b which are electrically connected parallel to one another, which can be ceramic chip capacitors (MLCCs).

In the active state of the second electrical system 5, the second electrical energy supply unit 7 is electrically connected via the second electrical system 5 to the electrical/electronic components 6 which are arranged in the second electrical system 5; in the idle state, by contrast, the second electric energy supply unit 7 is electrically isolated from the electrical/electronic components 6. To this end, a switching element 11 in the manner of an electrical or electronic switch can be provided in the second electrical system 5 which can be switched between an opened state and a closed state. In the opened state of the switching element, the second electric energy supply unit 7 is isolated from the second electrical system 5 and thus from the electrical/electronic components 6. The opened state of the switching element 11 thus corresponds to the idle state of the electrical system. In the closed state of the switching element 11, the electric energy supply unit 7, by contrast, is connected to the electrical system for providing electric energy to the electrical consumers 6. The closed state of the switching element 8 consequently corresponds to the active state of the electrical system.

It is clear that "opened state" of the switching element 11 and thus the idle state of the second electrical system 5 can also mean that no complete electrical isolation of the second electric energy supply unit 7 from the electrical system 5 takes place but that the electric energy supplied by the second electric energy supply unit 7 is limited to a maximum performance value or a maximum electric current value. This predetermined maximum value for the electric current can for example be 100 µa.

The switchable switching element 11 in this case can also be designed as an integrated circuit or as electric voltage transformer, which for electric current limitation in the opened state of the switching element 11, reduces the nominal electrical output voltage supplied by the second electric energy supply unit 7 to a lowered voltage value assigned to the idle state.

For activating the switchable switching element 11 for switching between the opened and the closed state, a control unit 12 in the manner of a microcontroller or of a microprocessor can be provided in the second electrical system. By means of the control unit 12, the switchable switching element 11 can be switched from the opened to the closed state as a function of the wake-up signal provided by the capacitive coupling element 9 in the second electrical system 5.

For generating a wake-up signal in the first electrical system 2, a signal generation unit 13 which interacts with the coupling element 9 is provided in the same, by means of which at the capacitive coupling element 9 on the input side an activation signal for activating the second electrical system 5 from the idle state can be generated. The signal generation unit 12 can for example be formed in the manner of a square-wave generator. In principle, the electric signal generated by the signal generation unit 13 can be any alternating voltage signal which can be transmitted by means of the capacitive coupling element 9 by the electrical system 2 to the second electrical system 5. In the case of the second electrical system 5, a signal receiving unit 14 which likewise interacts with the capacitive coupling element 9 on the output side is provided, by means of which the provision of the activation signal on the capacitive coupling element 9 is detected. The signal receiving unit 14 in the simplest case can be constructed in the manner of an electric rectifier which smoothes the alternating voltage signal generated by the signal generation unit 13, for example a square-wave signal, in the manner of a low pass. The signal receiving unit 14 interacts with the control unit 12 in such a manner that the signal receiving unit 14 transmits the reception of the activation signal to the control unit 12. This can take place for example via a suitable signal or data line which in FIG. 1 is reproduced roughly schematically by an arrow with the reference number 15.

In a version that can be technically realised in a particularly simple manner, the control unit 12 can also be omitted. In case that the signal receiving unit 14 has the electrical low pass explained above, the same can for example be directly connected to the switchable switching element 11 when it is formed as semiconductor switch in the manner of a transistor, and in this way activate the switching element. For example, the electronic low pass can be electrically connected to a gate connection of an FET transistor in order to control the source-drain channel of the transistor in this way. In this case, the second electronic energy supply unit 7 is connected to the source connection of such a transistor and the second electrical system 5 is connected to the drain connection of the FET transistor. Obviously, instead of a FET another transistor type, for example a bipolar transistor, can also be used.

Obviously, with respect to the concrete technical electronic construction of the signal receiving unit 14, of the control unit 12 and of the switchable switching element 11, a wide range of technical realisation options are conceivable. For example, in a version it can be considered to integrate the switchable switching element 11 in the manner of a semiconductor transistor in an electronic circuit assembly 1 in such a manner that the same, using the switchable switching element 11, acts as voltage divider, so that the nominal electrical output voltage provided by the second electric energy supply unit 7 in the idle state of the second electrical system 5 is reduced compared with the active state. To this end, the switchable switching element 11 can be integrated in a voltage divider in the manner of a semiconductor switch or transistor.

A charge pump 16 can be integrated, furthermore, in the signal generation unit 13 by means of which the amplitude of the alternating voltage signal generated by the signal generation unit 13 can be adjusted and increased or set to a desired output value.

Generating the wake-up signal respectively activating signal by the signal generation unit 13 in the first electrical system 2 can take place as a function of different events or parameters. In this connection, the first electrical system 2 can be likewise switchable between an active state and an idle state analogously to the second electrical system 5. Here, the electrical system assembly 1 can for example be designed in such a manner that switching the first electrical system 2 from the idle state to the active state brings about the generating of the activating signal by the signal generation unit 13 so that as a consequence the second electrical system 5 is automatically switched also from the idle state to the active state.

In further embodiment versions it can be considered that the first electrical system 2 is not only coupled to a single second electrical system 5 but to any number of further electrical systems. According to the invention, a coupling of the first electrical system 2 to these electrical systems can take place in each case by means of suitable capacitive coupling elements 9, which are then all switched from the idle state to the active state when in the first electrical system 2 a corresponding activation signal is present.

It can also be considered that the signal generation unit 13 is coupled to a bus system 17 of the motor vehicle, for example a CAN bus or LIN bus, so that a corresponding activation system is provided to the signal generation unit 13 by the bus system 17. Alternatively to generating the activation signal in connection with a wake-up signal generated by a bus system it can be provided in a version to generate an activation signal in the first electrical system 2 by way of the signal generation unit 13 as soon as the starter device of the internal combustion engine of the motor vehicle is activated.

Figure 2:
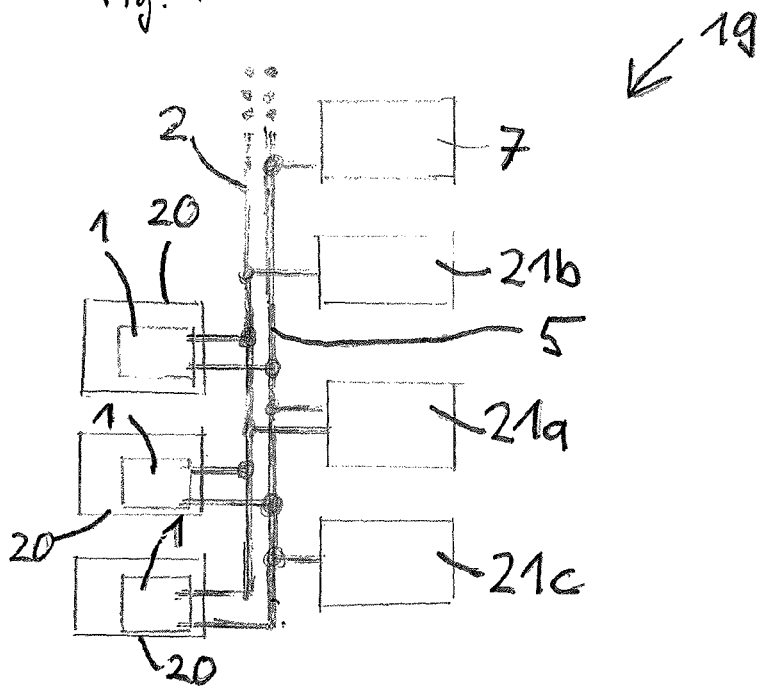

FIG. 2 shows a special application form of the electrical system assembly 1 according to the invention in connection with an electrical system 19. According to the example of FIG. 2, the electrical system assembly 1 in each case is part of an electrical consumer 20. In the example of FIG. 2, three such electrical consumers 20 are exemplarily shown with an electrical system assembly 1 each. The electrical consumers are thus part of the electrical system 19. It is clear that in versions another number of electrical consumers 20 can also be provided. Such an electrical consumer 20 can for example be an electric oil pump, an electric coolant pump, an electric turbocharger, an electric compressor or an electric fan. The first electrical system 2, which is likewise part of the electrical system 19, in this case extends across the three vehicle components 20, i.e. the electrical/electronic components 3 (see FIG. 1) of the electrical system assemblies 1 of the electrical consumers 20 are electrically connected to one another via the first electrical system 2. The same applies mutatis mutandis to the second electrical system 5 and the electrical/electronic components 6.

It is clear that in the electrical system 19 further electrical consumers can also be connected to the first and/or second electrical system 2, 5 without electrical system assembly 1 according to the invention; in the example of FIG. 2, a further electrical consumer 21a is exemplarily connected both to the first and also to the second electrical system 2, 5. A further electrical consumer 21 is only connected to the first electrical system 2 and a further electrical consumer 21c is exclusively connected to the second electrical system 5. It is clear that in versions of the example of FIG. 2, another number of further electrical consumers 21a, 21b, 21c can be provided.

The second electrical/electronic components 6 in the second electrical system 5 of the electrical system assemblies 1 can be connected to the second energy supply unit 7 that is provide in the second electrical system 5 when switching the second electrical system 5 from the idle state to the active state as explained in connection with FIG. 1. In this connection, all explanations regarding the electrical system assembly of FIG. 1, apply mutatis mutandis to the electrical system assemblies 1 shown in connection with the electrical system 19 in FIG. 2.

The invention claimed is:

1. An electrical system assembly for a motor vehicle, comprising:
   a first electrical system,
   a second electrical system galvanically isolated from the first electrical system, the second electrical system being switchable between an idle state and an active state,
   a capacitive coupling element, wherein the first electrical system is capacitively coupled to the second electrical system via the capacitive coupling element for transmitting signals,
   a signal transmission unit arranged in the first electrical system and communicating with the capacitive coupling element, wherein the signal transmission unit is configured to transmit an activation signal on an input side of the capacitive coupling element for activating the second electrical system from the idle state to the active state, and wherein the signal transmission unit includes a signal transmitter configured to transmit the activation signal as an alternating voltage signal,
   a signal receiving unit arranged in the second electrical system and communicating with the capacitive coupling element, wherein the signal receiving unit is configured to receive the activation signal on an output side of the capacitive coupling element and switch the second electrical system from the idle state to the active state in response to receiving the activation signal, and
   a charge pump disposed in the first electrical system between the signal transmission unit and the capacitive coupling element wherein the charge pump is configured to adjust an amplitude of the alternating voltage signal transmitted via the signal transmitter of the signal transmission unit.

2. The electrical system assembly according to claim 1, wherein the capacitive coupling element includes at least two capacitors electrically connected in parallel to one another.

3. The electrical system assembly according to claim 1, wherein the second electrical system is configured to receive an electric current from an energy supply unit in the idle state when the electric current is below a predetermined value.

4. The electrical system assembly according to claim 3, wherein the predetermined value is 100 µa.

5. The electrical system assembly according to claim 1, wherein:
   the second electrical system includes a switchable switching element, the switching element switchable between an opened state associated with the idle state of the second electrical system, and a closed state associated with the active state of the second electrical system,
   an energy supply unit electrically coupled to the second electrical system, wherein the energy supply unit in the closed state of the switching element is electrically connected to the second electrical system and in the opened state is electrically isolated from the second electrical system, and
   the second electrical system further includes a control unit interacting with the signal receiving unit, wherein the control unit is configured to switch the switching element to the closed state in response to the signal receiving unit receiving the activation signal.

6. The electrical system assembly according to claim 1, wherein the signal receiving unit includes a rectifier device configured to rectify the activation signal transmitted by the signal transmission unit.

7. The electrical system assembly according to claim 1, further comprising:
   at least one electrical consumer electrically connected to the first electrical system and the second electrical system;
   wherein the at least one consumer is electrically isolated from the second electrical system in the idle state and is electrically connected to the second electrical system in the active state.

8. A motor vehicle, comprising:
   at least two electrical consumers;
   at least one electrical system assembly for supplying electrical energy to the at least two electrical consumers, the at least one electrical system assembly including:
      a first electrical system;
      a second electrical system galvanically isolated from the first electrical system, the second electrical system switchable between an idle state and an active state;
      a capacitive coupling element in communication with the first electrical system and the second electrical system, wherein the first electrical system is capacitively coupled to the second electrical system via the capacitive coupling element for transmitting signals;
      a signal transmitting unit coupled to the first electrical system and communicating with an input side of the capacitive coupling element, wherein the signal transmitting unit is configured to transmit an activation signal to the input side of the capacitive coupling element for activating the second electrical system from the idle state to the active state, and wherein the signal transmission unit includes a signal transmitter configured to transmit the activation signal as an alternating voltage signal,
      a signal receiving unit coupled to the second electrical system and communicating with an output side of the capacitive coupling element, wherein the signal receiving unit is configured to switch the second electrical system from the idle state to the active state in response to receiving the activation signal wherein the at least two electrical consumers are electrically connected to one another via the first electrical system and second electrical system, of the at least one electrical system assembly;
      a charge pump disposed in the first electrical system between the signal transmission unit and the capacitive coupling element wherein the charge pump is configured to adjust an amplitude of the alternating voltage signal transmitted via the signal transmitter of the signal transmission unit; and
      a joint electric energy supply unit arranged in the second electrical system, wherein the joint electric energy supply unit is electrically isolated from the second electrical system in the idle state and is electrically connected to the second electrical system in the active state.

9. The motor vehicle according to claim 8, wherein the at least two electrical consumers include at least one of an oil pump, an electric coolant pump, an electric exhaust gas turbocharger, an electric compressor and an electric fan.

10. A method for activating an electrical system of an electrical system assembly, comprising:
    connecting capacitively a first electrical system to a second electrical system via a capacitive coupling element, wherein the first electrical system is galvanically isolated from the second electrical system, and wherein the second electrical system is switchable between an idle state and an active state;

transmitting an activation signal of a signal transmission unit arranged in the first electrical system to a signal receiving unit arranged in the second electrical system via the capacitive coupling element, wherein the signal transmission unit includes a signal transmitter configured to transmit the activation signal as an alternating voltage signal;

adjusting an amplitude of the alternating voltage signal using a charge pump disposed in the first electrical system between the signal transmission unit and the capacitive coupling element; and switching the second electrical system from the idle state to the active state in response to the signal receiving unit receiving the activation signal, wherein an electrical current in the second electrical system is at least one of interrupted and reduced in the idle state with respect to the active state.

11. The electrical system assembly according to claim 2, wherein at least one of the at least two capacitors includes a ceramic chip capacitor.

12. The electrical system assembly according to claim 7, wherein the second electrical system is configured to communicate an electric current to the at least one electrical consumer in the idle state when the electric current is below an predetermined threshold.

13. The electrical system assembly according to 12, wherein the predetermined threshold is 100 μa.

14. The motor vehicle according to claim 8, wherein the capacitive coupling element includes at least two capacitors electrically connected in parallel to one another.

15. The motor vehicle according to claim 8, wherein an electrical current supplied to the second electrical system via the joint electric energy supply unit is at least one of interrupted and reduced in the idle state with respect to the active state.

16. The motor vehicle according to claim 8, wherein the second electrical system includes a switching element switchable between an opened state associated with the idle state of the second electrical system and a closed state associated with the active state of the second electrical system;

wherein the joint electric energy supply unit is electrically connected to the second electrical system in the closed state of the switching element and is electrically isolated from the second electrical system in the opened state of the switching element; and the at least one electrical system assembly further includes a control unit in communication with the signal receiving unit and the switching element, wherein the control unit is configured to switch the switching element to the closed state in response to the signal receiving unit receiving the activation signal.

* * * * *